United States Patent
Kose et al.

(10) Patent No.: US 8,716,419 B2
(45) Date of Patent: May 6, 2014

(54) FLUORINATED ELASTIC COPOLYMER AND PRODUCTION PROCESS

(75) Inventors: Takehiro Kose, Tokyo (JP); Mitsuru Seki, Tokyo (JP); Hiroshi Funaki, Tokyo (JP); Yasuhiko Matsuoka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 296 days.

(21) Appl. No.: 12/892,295

(22) Filed: Sep. 28, 2010

(65) Prior Publication Data

US 2011/0015342 A1    Jan. 20, 2011

Related U.S. Application Data

(63) Continuation of application No. PCT/JP2009/052940, filed on Feb. 19, 2009.

(30) Foreign Application Priority Data

Mar. 28, 2008  (JP) .................................. 2008-087936

(51) Int. Cl.
*C08F 2/00*    (2006.01)

(52) U.S. Cl.
USPC ............................. 526/206; 526/247; 526/255

(58) Field of Classification Search
USPC .......................................... 526/206, 247, 255
See application file for complete search history.

(56) References Cited

U.S. PATENT DOCUMENTS

| | | |
|---|---|---|
| 5,037,921 A | 8/1991 | Carlson |
| 5,102,965 A | 4/1992 | Carlson |
| 2006/0199898 A1 | 9/2006 | Funaki et al. |
| 2007/0100062 A1 | 5/2007 | Lyons et al. |
| 2009/0054593 A1 | 2/2009 | Funaki et al. |

FOREIGN PATENT DOCUMENTS

| | | |
|---|---|---|
| EP | 0 446 725 A1 | 9/1991 |
| EP | 1 698 662 A1 | 9/2006 |
| JP | 53-125491 | 11/1978 |
| JP | 63-23907 | 2/1988 |
| JP | 3-247608 | 11/1991 |
| JP | 5-222130 | 8/1993 |
| JP | 8-12838 | 1/1996 |
| JP | 2006-70245 | 3/2006 |
| WO | WO 2007/050933 A1 | 5/2007 |
| WO | WO 2007/119834 A1 | 10/2007 |

OTHER PUBLICATIONS

Extended European Search Report issued on Feb. 1, 2011 in corresponding European Application No. 09724032.9.
U.S. Appl. No. 13/100,536, filed May 4, 2011, Kose, et al.
U.S. Appl. No. 13/551,157, filed Jul. 17, 2012, Kose, et al.

*Primary Examiner* — Peter D Mulcahy
(74) *Attorney, Agent, or Firm* — Oblon, Spivak, McClelland, Maier & Neustadt, L.L.P.

(57) ABSTRACT

To provide a fluorinated elastic copolymer having high crosslinkability, having high flowability and excellent in the compression set and the resistance to bases, and its production process.

A process for producing a fluorinated elastic copolymer, which comprises copolymerizing (a) tetrafluoroethylene and (b) propylene and as the case requires, (c) a perfluoro(alkyl vinyl ether) in the presence of an iodine compound represented by the formula $RI_2$ (wherein R is a hydrocarbon group or perfluoroalkyl group having at least 3 carbon atoms) at a temperature of from 0° C. to 50° C., and a fluorinated elastic copolymer obtained by the production process.

16 Claims, No Drawings

FLUORINATED ELASTIC COPOLYMER AND PRODUCTION PROCESS

CROSS REFERENCE TO RELATED APPLICATION

This application is a continuation application of PCT/JP2009/052940, filed on Feb. 19, 2009, and claims priority to Japanese Patent Application No. 2008-087936, filed on Mar. 28, 2008.

TECHNICAL FIELD

The present invention relates to a fluorinated elastic copolymer excellent in crosslinkability, having high flowability, and excellent in the compression set and the base resistance, and its production process.

BACKGROUND ART

A fluorinated elastic copolymer is excellent in the heat resistance, the chemical resistance, the oil resistance, the weather resistance, etc., and accordingly applicable in a severe environment which a conventional hydrocarbon material cannot withstand. As a fluorinated elastic copolymer, a vinylidene fluoride/hexafluoropropylene copolymer, a tetrafluoroethylene/propylene copolymer, a tetrafluoroethylene/perfluoro(alkyl vinyl ether) copolymer, etc. have been known.

Such a fluorinated elastic copolymer is poor in reactivity and is thereby insufficient in crosslinkability and adhesion to other materials, and accordingly a method of introducing a reactive functional group thereby to improve the reactivity has been proposed. Particularly, in order to improve crosslinkability by a peroxide, a method of copolymerizing a special curable monomer or pre-treatment before crosslinking by a peroxide, has been carried out. For example, a fluorinated elastic copolymer obtained by copolymerizing vinylidene fluoride with hexafluoropropylene in the presence of a fluorinated chain transfer agent containing an iodine atom, contains an iodine atom at the terminal of the polymer, and accordingly peroxide crosslinking is possible (Patent Document 1).

On the other hand, a tetrafluoroethylene/propylene copolymer is excellent in the amine resistance and the high temperature steam resistance as compared with the above fluorinated elastic copolymer having repeating units of vinylidene fluoride. As such a tetrafluoroethylene/propylene copolymer, a fluorinated elastic copolymer obtainable by copolymerizing a monomer having a crosslinkable functional group such as a vinyl ester monomer has been proposed (Patent Document 2). However, such a tetrafluoroethylene/propylene copolymer is insufficient in flowability in a cavity of a mold in a case where a product having a complicated shape is to be produced.

A fluorinated elastic copolymer obtainable by copolymerizing a tetrafluoroethylene/propylene in the presence of a fluorinated chain transfer agent containing an iodine atom has also been proposed (Patent Document 3). However, by the method disclosed in the Patent Document, the polymerization rate is low, and the productivity of the fluorinated elastic copolymer is very low. Further, the fluorinated elastic copolymer to be obtained has insufficient crosslinkability, and physical properties of a crosslinked rubber such as the compression set are unsatisfactory.

Accordingly, development of a process for producing a fluorinated elastic copolymer excellent in the crosslinkability, having high flowability and excellent in the compression set and the base resistance has been desired.

Patent Document 1: JP-A-53-125491
Patent Document 2: JP-A-2006-70245
Patent Document 3: JP-A-5-222130

DISCLOSURE OF THE INVENTION

Object to be Accomplished by the Invention

The object of the present invention is to provide a fluorinated elastic copolymer excellent in the crosslinkability, having high flowability and excellent in the heat resistance, the chemical resistance and the compression set, and its production process.

Means to Accomplish the Object

The present invention provides a fluorinated elastic copolymer obtainable by copolymerizing tetrafluoroethylene and propylene and as the case requires, a perfluoro(alkyl vinyl ether), wherein when crosslinking properties of a fluorinated elastic copolymer composition obtained by kneading 100 parts by mass of the fluorinated elastic copolymer, 30 parts by mass of carbon black, 5 parts by mass of triallyl isocyanurate and 1 part by mass of 1,3-bis(tert-butylperoxyisopropyl)benzene are measured using a crosslinking property measuring machine at 177° C. for 12 minutes with an amplitude angle of 3°, the ($M_H$–$M_L$) value which is a difference between the maximum torque ($M_H$) and the minimum torque ($M_L$) is at least 30 dN·m.

Further, the present invention provides the above fluorinated elastic copolymer, wherein the molar ratio of repeating units based on tetrafluoroethylene/repeating units based on propylene is from 30/70 to 70/30.

Further, the present invention provides the above fluorinated elastic copolymer, which contains iodine atoms in a content of from 0.01 to 5.0 mass %.

Further, the present invention provides a process for producing a fluorinated elastic copolymer, which comprises copolymerizing tetrafluoroethylene and propylene and as the case requires, a perfluoro(alkyl vinyl ether) in the presence of a radical polymerization initiator and an iodine compound represented by the formula $RI_2$ (wherein R is an alkylene group or perfluoroalkylene group having at least 3 carbon atoms) at a polymerization temperature of from 0° C. to 50° C.

Further, the present invention provides the above process for producing a fluorinated elastic copolymer, wherein the copolymerization is copolymerization by emulsion polymerization carried out in an aqueous medium in the presence of an emulsifier at a pH of the aqueous medium of from 7 to 14.

Further, the present invention provides the above process for producing a fluorinated elastic copolymer, wherein $RI_2$ is at least one member selected from the group consisting of 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane and 1,8-diiodoperfluorooctane.

Further, the present invention provides the above process for producing a fluorinated elastic copolymer, wherein the emulsifier is a fluorinated ether carboxylic acid compound represented by the formula (1): $R^{f1}OR^{f2}COOA$ (wherein $R^{f1}$ is a $C_{1-8}$ perfluoroalkyl group, $R^{f2}$ is a linear fluorinated alkylene group, the fluorinated alkylene group may have an etheric oxygen atom, and the fluorinated alkylene group may have a side chain of a $C_{1-3}$ perfluoroalkyl group, and A is a hydrogen atom, an alkali metal or $NH_4$).

Further, the present invention provides the above process for producing a fluorinated elastic copolymer, wherein the emulsifier is a fluorinated ether carboxylic acid compound represented by the formula (2): $F(CF_2)_pO(CF(X)CF_2O)_qCF(X)COOA$ (wherein X is a fluorine atom or a $C_{1-3}$ perfluoroalkyl group, A is a hydrogen atom, an alkali metal or $NH_4$, p is an integer of from 1 to 10, and q is an integer of from 0 to 3).

Further, the present invention provides the above process for producing a fluorinated elastic copolymer, wherein the radical polymerization initiator is a redox polymerization initiator.

Further, the present invention provides a fluorinated elastic copolymer composition comprising the above fluorinated elastic copolymer, and at least one copolymer selected from the group consisting of a tetrafluoroethylene/ethylene copolymer, a vinylidene fluoride/hexafluoropropylene copolymer, a tetrafluoroethylene/propylene copolymer other than the fluorinated elastic copolymer and an ethylene-propylene-disconjugated diene copolymer, wherein the ratio of the fluorinated elastic copolymer to the copolymer is such that the fluorinated elastic copolymer/the copolymer (mass ratio)=100/1 to 100/300.

Effects of the Invention

The fluorinated elastic copolymer of the present invention is excellent in the crosslinkability, has high flowability and is excellent in the heat resistance, the chemical resistance and the compression set. Particularly, it is excellent in the injection moldability and is suitable for a product having a complicated shape.

Further, the fluorinated elastic copolymer composition of the present invention is excellent in the extrudability, and is suitable for a wire covering material.

BEST MODE FOR CARRYING OUT THE INVENTION

The fluorinated elastic copolymer of the present invention is a fluorinated elastic copolymer obtainable by compolymerizing tetrafluoroethylene (hereinafter referred to as TFE) and propylene (hereinafter referred to as P) and as the case requires, a perfluoro(alkyl vinyl ether) (hereinafter referred to as PAVE).

With respect to the copolymerization ratio of TFE to P, the proportion of monomers present in the polymerization system is determined so that the repeating units based on TFE/the repeating units based on P in the fluorinated elastic copolymer to be obtained becomes 30/70 to 70/30 (molar ratio). The ratio of the repeating units based on TFE to the repeating units based on P is more preferably from 45/55 to 65/35, furthermore preferably from 50/50 to 60/40 (molar ratio).

With respect to the proportion of monomers present in the polymerization system to obtain the above copolymerization ratio, TFE/P is preferably from 5/95 to 98/2 (molar ratio), more preferably from 40/60 to 95/5 (molar ratio), most preferably from 50/50 to 93/7 (molar ratio).

Further, in a case where PAVE is copolymerized, the ratio of the repeating units based on TFE/the repeating units based on P/the repeating units based on PAVE in the fluorinated elastic copolymer to be obtained is preferably 30 to 60/10 to 40/10 to 40 (molar ratio).

Further, for the fluorinated elastic copolymer of the present invention, in addition to TFE, P and PAVE, other monomer may be copolymerized within a range not to impair the effect of the present invention.

Such other monomer may, for example, be a fluorinated olefin such as monofluoroethylene, trifluoroethylene, trifluoropropylene, pentafluoropropylene, hexafluoropropylene, hexafluoroisobutylene or dichlorodifluoroethylene; a hydrocarbon olefin such as ethylene, 1-butene or isobutylene; an alkyl vinyl ether such as methyl vinyl ether, ethyl vinyl ether, butyl vinyl ether or cyclohexyl vinyl ether; a vinyl ester such as vinyl acetate or vinyl propionate; or vinyl chloride, vinylidene chloride or trifluorostyrene.

In the process for producing a fluorinated elastic copolymer of the present invention, the iodine compound represented by the formula $RI_2$ is an iodine compound having an iodine atom bonded to each terminal of an alkylene group or perfluoroalkylene group having at least 3 carbon atoms.

Specifically, it may, for example, be 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane or 1,8-diiodoperfluorooctane. The number of carbon atoms in the iodine compound represented by the formula $RI_2$ is preferably from 3 to 8. The iodine compound represented by the formula $RI_2$ is more preferably an iodine compound having a perfluoroalkylene group, most preferably 1,4-diiodoperfluorobutane.

In the present invention, it is preferred to add the iodine compound represented by the formula $RI_2$ so that the iodine atom content in the fluorinated elastic copolymer is from 0.01 to 5.0 mass %, more preferably from 0.1 to 1.0 mass %.

In the process for producing a fluorinated elastic copolymer of the present invention, the polymerization method may, for example, be an emulsion polymerization method, a solution polymerization method, a suspension polymerization method or a bulk polymerization method. Particularly preferred is an emulsion polymerization method of polymerizing monomers such as TFE and P in an aqueous medium in the presence of an emulsifier, in view of easy controllability of the molecular weight and the copolymer composition and excellent productivity.

The aqueous medium is preferably water or water containing a water soluble organic solvent, more preferably water containing a water soluble organic solvent.

The water soluble organic solvent may, for example, be tert-butanol, propylene glycol, dipropylene glycol, dipropylene glycol monomethyl ether or tripropylene glycol.

The water soluble organic solvent is preferably tert-butanol, propylene glycol or dipropylene glycol monomethyl ether, more preferably tert-butanol.

The content of the water soluble organic solvent in the aqueous medium is preferably from 1 to 50 parts by mass, more preferably from 3 to 20 parts by mass per 100 parts by mass of water.

In the emulsion polymerization method, the pH of the aqueous medium is preferably from 7 to 14, more preferably from 7 to 11, furthermore preferably from 7.5 to 11, most preferably from 8 to 10.5. In a case where the pH is lower than 7, stability of the iodine compound may be decreased, and the crosslinkability of the fluorinated elastic copolymer to be obtained is decreased in some cases.

The period over which the pH of the aqueous medium is within the above range is preferably the entire polymerization period from initiation to completion of the emulsion polymerization, but may not be the entire polymerization period. It is preferably at least 80%, more preferably at least 90%, furthermore preferably at least 95% of the entire polymerization period.

To adjust the pH, it is preferred to use a pH buffer. The pH buffer may, for example, be an inorganic acid salt. The inorganic acid salt may, for example, be a phosphate such as disodium hydrogen phosphate or sodium dihydrogen phosphate, or a carbonate such as sodium hydrogen carbonate or sodium carbonate. Specifically, the phosphate may, for example, be more preferably disodium hydrogen phosphate dihydrate or disodium hydrogen phosphate dodecahydrate.

The emulsifier is preferably an ionic emulsifier, more preferably an anionic emulsifier in view of excellent mechanical and chemical stability of a latex of the fluorinated elastic copolymer to be obtained.

As the anionic emulsifier, a known one may be used, and specifically, it may, for example, be a hydrocarbon emulsifier such as sodium lauryl sulfate or sodium dodecylbenzene sulfonate, a fluorinated alkanoate such as ammonium perfluorooctanoate or ammonium perfluorohexanoate, or a fluorinated ether carboxylic acid compound (hereinafter referred to as a compound of the formula (1)) represented by the formula (1): $R^{f1}OR^{f2}COOA$ (wherein $R^{f1}$ is a $C_{1-8}$ perfluoroalkyl group, $R^{f2}$ is a linear fluorinated alkylene group, the fluorinated alkylene group may have an etheric oxygen atom, and the fluorinated alkylene group may have a side chain of a $C_{1-3}$ perfluoroalkyl group, and A is a hydrogen atom, an alkali metal or $NH_4$). The number of carbon atoms in $R^{f2}$ is preferably from 1 to 12, more preferably from 1 to 8.

The emulsifier in the present invention is preferably the fluorinated emulsifier, more preferably the fluorinated alkanoate or the compound of the formula (1).

Further, most preferred is a fluorinated ether carboxylic acid compound (hereinafter referred to as a compound of the formula (2)) represented by the formula (2): $F(CF_2)_pO(CF(X)CF_2O)_qCF(X)COOA$ (wherein X is a fluorine atom or a $C_{1-3}$ perfluoroalkyl group, A is a hydrogen atom, an alkali metal or $NH_4$, p is an integer of from 1 to 10, and q is an integer of from 0 to 3).

As examples of the compound represented by the formula (1) or the compound represented by the formula (2) wherein A is $NH_4$, the following compounds may be mentioned.

$C_2F_5OCF_2COONH_4$, $C_3F_7OCF_2COONH_4$, $C_4F_9OCF_2COONH_4$, $C_5F_{11}OCF_2COONH_4$, $C_6F_{13}OCF_2COONH_4$, $CF_3OCF_2CF_2OCF_2COONH_4$, $C_2F_5OCF_2CF_2OCF_2COONH_4$, $C_3F_7OCF_2CF_2OCF_2COONH_4$, $C_4F_9OCF_2CF_2OCF_2COONH_4$, $C_5F_{11}OCF_2CF_2OCF_2COONH_4$, $C_6F_{13}OCF_2CF_2OCF_2COONH_4$, $C_2F_5O(CF_2CF_2O)_2CF_2COONH_4$, $C_3F_7O(CF_2CF_2O)_2CF_2COONH_4$, $C_4F_9O(CF_2CF_2O)_2CF_2COONH_4$, $C_5F_{11}O(CF_2CF_2O)_2CF_2COONH_4$, $C_6F_{13}O(CF_2CF_2O)_2CF_2COONH_4$, $C_2F_5O(CF_2CF_2O)_3CF_2COONH_4$, $C_3F_7O(CF_2CF_2O)_3CF_2COONH_4$, $C_4F_9O(CF_2CF_2O)_3CF_2COONH_4$, $C_5F_{11}O(CF_2CF_2O)_3CF_2COONH_4$, $C_6F_{13}O(CF_2CF_2O)_3CF_2COONH_4$, $C_2F_5OCF(CF_3)COONH_4$, $C_3F_7OCF(CF_3)COONH_4$, $C_4F_9OCF(CF_3)COONH_4$, $C_2F_5OCF(CF_3)CF_2OCF(CF_3)COONH_4$, $C_3F_7OCF(CF_3)CF_2OCF(CF_3)COONH_4$, $C_2F_5O(CF(CF_3)CF_2O)_2CF(CF_3)COONH_4$, $C_3F_7O(CF(CF_3)CF_2O)_2CF(CF_3)COONH_4$, $CF_3O(CF_2)_3OCF_2COONH_4$, $C_2F_5O(CF_2)_3OCF_2COONH_4$, $CF_3O(CF_2)_3O(CF_2)_2COONH_4$, $CF_3CF_2O(CF_2)_2O(CF_2)_2COONH_4$, $CF_3O(CF_2)_3OCF(CF_3)COONH_4$, $C_2F_5O(CF_2)_3OCF(CF_3)COONH_4$, $CF_3O(CF_2)_3O(CF_2)_2COONH_4$ and $CF_3OCF_2OCF_2OCF_2COONH_4$ may, for example, be mentioned.

As examples of the more preferred compound of the formula (2), $F(CF_2)_2OCF_2CF_2OCF_2COONH_4$, $F(CF_2)_2O(CF_2CF_2O)_2CF_2COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$ and $F(CF_2)_2OCF(CF_3)CF_2OCF(CF_3)COONH_4$ may, for example, be mentioned.

The content of the emulsifier is preferably from 0.01 to 15 parts by mass, more preferably from 0.1 to 10 parts by mass, most preferably from 0.1 to 3 parts by mass per 100 parts by mass of the aqueous medium.

In the process for producing a fluorinated elastic copolymer of the present invention, the polymerization temperature is from 0° C. to 50° C., preferably from 10° C. to 40° C., more preferably from 20° C. to 30° C. If the polymerization temperature exceeds 50° C., the crosslinkability of the fluorinated elastic copolymer to be obtained will be remarkably decreased, such being unfavorable. When the polymerization temperature is within this range, the obtained fluorinated elastic copolymer is excellent in the crosslinkability, and a crosslinked rubber will be excellent in the mechanical properties.

The radical polymerization initiator in the production process of the present invention is preferably a water soluble initiator or a redox polymerization initiator. The content of the radical polymerization initiator is preferably from 0.0001 to 3 mass %, more preferably from 0.001 to 1 mass % to the total mass of the monomers.

The water soluble initiator may, for example, be a persulfate (such as ammonium persulfate, sodium persulfate or potassium persulfate) or an organic initiator (such as disuccinic acid peroxide or azobisisobutylamidine dihydrochloride), and a persulfate such as ammonium persulfate is preferred. Particularly, ammonium persulfate is most preferred.

The redox initiator may be a combination of a persulfate with a reducing agent, and it should be a polymerization initiator which makes it possible to polymerize monomers such as TFE and P at a polymerization temperature within a range of from 0° C. to 50° C. Specifically, the persulfate may, for example, be ammonium persulfate or an alkali metal persulfate such as sodium persulfate or potassium persulfate, and it is particularly preferably ammonium persulfate. Further, the reducing agent may, for example, be a thiosulfate, a sulfite, a bisulfite, a pyrosulfite or a hydroxymethanesulfinate, and is preferably a hydroxymethanesulfinate, most preferably sodium hydroxymethanesulfinate.

Further, it is preferred that a small amount of iron, an iron salt such as a ferrous salt, silver sulfate or the like preferably coexists as a third component, particularly preferably a water soluble iron salt coexists. Specifically, the water soluble iron salt may, for example, be ferrous sulfate, ferric sulfate, iron (II) nitrate, iron(III) nitrate, ferrous chloride, ferric chloride, ferrous ammonium sulfate or ferric ammonium sulfate.

It is most preferred to add a chelate agent in addition to the redox initiator system. As the chelate agent, disodium ethylenediaminetetraacetate is most preferably mentioned.

The amount of use of the persulfate is preferably from 0.001 to 3 mass %, more preferably from 0.01 to 1 mass %, particularly preferably from 0.05 to 0.5 mass % to the aqueous medium (100 mass %).

The amount of use of the reducing agent is preferably from 0.001 to 3 mass %, more preferably from 0.01 to 1 mass %, particularly preferably from 0.05 to 0.5 mass % to the aqueous medium (100 mass %).

Further, the amount of use of the third component such as iron, the iron salt such as a ferrous salt or silver sulfate is preferably from 0.0001 to 0.3 mass %, more preferably from 0.001 to 0.1 mass %, particularly preferably from 0.01 to 0.1 mass % to the aqueous medium (100 mass %).

The chelate agent is preferably from 0.0001 to 0.3 mass %, more preferably from 0.001 to 0.1 mass %, particularly preferably from 0.01 to 0.1 mass % to the aqueous medium (100 mass %).

The polymerization pressure in the process for producing a fluorinated elastic copolymer of the present invention is preferably from 1.0 to 10 MPaG, more preferably from 1.5 to 5.0 MPaG, most preferably from 2.0 to 4.0 MPaG. If the polymerization pressure is less than 1.0 MPaG, the polymerization rate is very low, such being unfavorable. Within this range, the polymerization rate is appropriate and is easily controlled, and excellent productivity is obtained.

According to the process for producing a fluorinated elastic copolymer of the present invention, the polymerization rate can be from 10 to 100 g/L·hr. The polymerization rate is preferably from 5 to 70 g/L·hr, more preferably from 30 to 50 g/L·hr. If the polymerization rate is lower than the above range, the productivity will be decreased, such being practically unfavorable. On the other hand, if it is higher than the above range, the molecular weight will be decreased, and the crosslinking properties will be decreased, such being unfavorable.

The latex of the fluorinated elastic copolymer obtained by the above emulsion polymerization method is subjected to coagulation by a known method to isolate the fluorinated elastic copolymer. As the coagulation method, a method of adding a metal salt for salting out, a method of adding an inorganic acid such as hydrochloric acid, a method by mechanical shearing, or a method of freezing/thawing may, for example, be mentioned.

The fluorinated elastic copolymer of the present invention is such that when crosslinking properties of a fluorinated elastic copolymer composition obtained by kneading 100 parts by mass of the fluorinated elastic copolymer, 30 parts by mass of carbon black, 5 parts by mass of triallyl isocyanurate and 1 part by mass of 1,3-bis(tert-butylperoxyisopropyl)benzene are measured using a crosslinking property measuring machine at 177° C. for 12 minutes with an amplitude angle of 3°, the $(M_H-M_L)$ value which is a difference between the maximum torque $(M_H)$ and the minimum torque $(M_L)$ is at least 30 dN·m, preferably at least 35 dN·m, more preferably at least 38 dN·m.

Further, $t_{90}$ (90% crosslinking time) which represents the time required until the torque reaches 90% of the maximum value $(M_H)$ is preferably at most 5 minutes, more preferably at most 4 minutes, particularly preferably at most 3.5 minutes, most preferably at most 3 minutes.

The above kneading can be carried out under usual conditions by a mixing apparatus for a rubber such as rolls, a kneader, a banbury mixer or an extruder, and kneading by twin rolls is preferred.

The Moony viscosity of the fluorinated elastic copolymer of the present invention is preferably from 5 to 200, more preferably from 10 to 170, most preferably from 20 to 100.

The Moony viscosity is an index for the molecular weight of a rubber, measured in accordance with JIS K6300 using an L type rotor having a diameter of 38.1 mm and a thickness of 5.54 mm at 100° C. for a preheat time of 1 minute for a rotor rotating time of 10 minutes. Within this range, excellent balance of flowability and crosslinking properties will be obtained.

The glass transition temperature of the fluorinated elastic copolymer of the present invention is preferably from −40 to 20° C., more preferably from −20 to 10° C.

The specific gravity of the fluorinated elastic copolymer of the present invention is preferably from 1.20 to 1.70, more preferably from 1.40 to 1.65.

The fluorinated elastic copolymer obtainable by the production process of the present invention is preferably crosslinked by using an organic peroxide. The organic peroxide may, for example, be a dialkyl peroxide (such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane or 2,5-dimethyl-2,5-di(tert-butylperoxy)hexane-3), 1,1-di(tert-butylperoxy)-3,3,5trimethylcyclohexane, 2,5-dimethylhexane-2,5-dihydroxyperoxide, benzoyl peroxide, tert-butylperoxybenzene, 2,5-dimethyl-2,5-di(benzoylperoxy)hexane, tert-butylperoxymaleic acid or tert-butylperoxyisopropyl carbonate, and a dialkyl peroxide is preferred.

The used amount of the organic peroxide is preferably from 0.3 to 10 parts by mass, more preferably from 0.3 to 5 parts by mass, furthermore preferably from 0.5 to 3 parts by mass per 100 parts by mass of the fluorinated elastic copolymer. When the amount of use of the organic peroxide is within the above range, the crosslinking rate will be appropriate, and the obtained crosslinked rubber will be excellent in the balance between the tensile strength and the elongation.

Further, it is preferred to add a crosslinking agent as the case requires, whereby the crosslinkability will be improved. The crosslinking agent may, for example, be triallyl cyanurate, triallyl isocyanurate, trimethacryl isocyanurate, 1,3,5-triacryloylhexahydro-1,3,5-triazine, triallyl trimeritate, m-phenylenediaminebismaleimide, p-quinone dioxime, p,p'-dibenzoyl quinone dioxime, dipropargyl terephthalate, diallyl phthalate, N,N',N'',N'''-tetraallylterephthalamide or a vinyl group-containing siloxane oligomer (such as polymethylvinylsiloxane or polymethylphenylvinylsiloxane), and is preferably triallyl cyanurate, triallyl isocyanurate or trimethacryl isocyanurate, more preferably triallyl isocyanurate.

The addition amount of the crosslinking agent is preferably from 0.1 to 20 parts by mass, more preferably from 1 to 10 parts by mass per 100 parts by mass of the fluorinated elastic copolymer. When the amount of addition of the crosslinking agent is within this range, the crosslinking rate will be appropriate, and the obtained crosslinked rubber will be excellent in the balance between the strength and the elongation.

Further, as the case requires, a metal oxide may be added to the fluorinated elastic copolymer. The metal oxide is preferably an oxide of a bivalent metal. The oxide of a bivalent metal may, for example, be preferably magnesium oxide, calcium oxide, zinc oxide or lead oxide. The added amount of the metal oxide is preferably from 0.1 to 10 parts by mass, more preferably from 0.5 to 5 parts by mass per 100 parts by mass of the fluorinated elastic copolymer.

By addition of the metal oxide, the high crosslinking performance which is a characteristic of the fluorinated elastic copolymer of the present invention can be more improved.

Further, when the fluorinated elastic copolymer of the present invention is crosslinked, a pigment for coloring the fluorinated elastic copolymer, a filler, a reinforcing agent or the like may be blended. The filler or the reinforcing agent commonly used may, for example, be carbon black, titanium oxide, silicon dioxide, clay or talc.

Further, with the fluorinated elastic copolymer of the present invention, a polymer material other than the fluorinated elastic copolymer is preferably blended depending on the purpose of use to obtain a fluorinated elastic copolymer composition. Such a polymer material may, for example, be a fluororesin such as polytetrafluoroethylene, polyvinylidene fluoride, polyvinyl fluoride, polychlorotrifluoroethylene or a tetrafluoroethylene/ethylene copolymer; a fluorinated elastomer such as a vinylidene fluoride/hexafluoropropylene copolymer, a tetrafluoroethylene/propylene copolymer other than the fluorinated elastic copolymer, a vinylidene fluoride/tetrafluoroethylene/hexafluoropropylene copolymer or a tetrafluoroethylene/perfluoro(alkyl vinyl ether) copolymer; or a hydrocarbon elastomer such as an ethylene-propylene-disconjugated diene copolymer. For example, when a fluororesin such as a tetrafluoroethylene/ethylene copolymer is blended with the fluorinated elastic copolymer of the present invention, the moldability and the strength can further be improved in addition to high crosslinking properties and flowability which are characteristics of the fluorinated elastic copolymer of the present invention. Further, when an elastomer such as an ethylene-propylene-disconjugated diene copolymer is blended with the fluorinated elastic copolymer of the present invention, high crosslinking properties which are characteristics of the fluorinated elastic copolymer of the present invention can further be improved.

The polymer material to be contained in the fluorinated elastic copolymer composition of the present invention is preferably at least one copolymer selected from the group consisting of a tetrafluoroethylene/ethylene copolymer, a vinylidene fluoride/hexafluoropropylene copolymer, a tetrafluoroethylene/propylene copolymer other than the fluorinated elastic copolymer and an ethylene-propylene-disconjugated diene copolymer.

The ratio of the fluorinated elastic copolymer to the above copolymer contained in the fluorinated elastic copolymer composition of the present invention is such that the fluorinated elastic copolymer/the copolymer (mass ratio) is preferably 100/1 to 100/300, more preferably 100/5 to 100/200, most preferably 100/10 to 100/100.

With the fluorinated elastic copolymer composition of the present invention, it is also preferred to blend the above crosslinking agent or various fillers.

The fluorinated elastic copolymer of the present invention is uniformly mixed with the organic peroxide, the crosslinking agent and other various additives by means of a mixing apparatus for a rubber such as rolls, a kneader, a banbury mixer or an extruder thereby to easily obtain a fluorinated elastic copolymer composition.

The fluorinated elastic copolymer composition is usually crosslinked at the same time as being molded by a method such as hot pressing, but may be preliminarily molded and then crosslinked.

As the molding method, compression molding, injection molding, extrusion, calendering, or dipping or coating after dissolved in a solvent, may, for example, be employed.

As the crosslinking conditions, various conditions such as hot press crosslinking, steam crosslinking, hot air crosslinking or lead encasing crosslinking may be employed, considering the molding method and the shape of a crosslinked product. As the crosslinking temperature, usually a range of from 100 to 400° C. for from several seconds to 24 hours is preferably employed. Further, secondary crosslinking is preferably employed for the purpose of improving mechanical properties and the compression set of a crosslinked product and stabilizing other properties. As the secondary crosslinking conditions, a temperature of from 100 to 300° C. for from about 30 minutes to about 48 hours is preferred.

The molded fluorinated elastic copolymer composition is also preferably crosslinked by irradiation with radiation. The radiation to be applied may, for example, be electron rays or ultraviolet rays. The amount of irradiation with electron rays is preferably from 0.1 to 30 Mrad, more preferably from 1 to 20 Mrad.

The fluorinated elastic copolymer composition can have a reduced compression set. The compression set is preferably at most 50, more preferably at most 40, furthermore preferably at most 35.

EXAMPLES

Now, the present invention will be described in further detail with reference to Examples, but it should be understood that the present invention is by no means restricted thereto. The respective physical properties were measured by the following methods.

(Ratio of Repeating Units in Fluorinated Elastic Copolymer)

The ratio of the repeating units based on TFE to the repeating units based on P in the fluorinated elastic copolymer was calculated by fluorine content analysis of the fluorinated elastic copolymer.

(Glass Transition Temperature (° C.))

Using model DSC220 manufactured by Seiko Instruments Inc., 10±0.1 mg of the fluorinated elastic copolymer was heated from −50° C. to 150° C. at a rate of 10° C./min and then cooled to −50° C. at a rate of 10° C. min, and the obtained center temperature of the endothermic peak change was regarded as the glass transition temperature.

(Moony Viscosity)

The Moony viscosity of the fluorinated elastic copolymer was measured in accordance with JIS K6300 using an L rotor having a diameter of 38.1 mm and a thickness of 5.54 mm at 100° C. for a preheat time of 1 minute at a rotor rotating time of 4 minutes. A high value indirectly means a high molecular weight.

(Specific Gravity)

The specific gravity of the fluorinated elastic copolymer was measured by a method in accordance with JIS K6220-1 using a specific gravity meter manufactured by SHINKO DENSHI CO., LTD.

(Measurement of Crosslinking Properties and Crosslinked Rubber Physical Properties)

100 parts by mass of the fluorinated elastic copolymer, 30 parts by mass of carbon black, 5 parts by mass of triallyl isocyanurate and 1 part by mass of 1,3-bis(tert-butylperoxyisopropyl)benzene (manufactured by Kayaku Akzo Corporation, tradename "Perkadox 14") were kneaded by twin rolls at room temperature for 10 minutes to obtain a uniformly mixed fluorinated elastic copolymer composition. Crosslinking properties of the obtained fluorinated elastic copolymer composition were measured by using a crosslinking property measuring machine (manufactured by ALPHA TECHNOLOGY Co., LTD., tradename "RPA2000") at 177° C. for 12 minutes with an amplitude angle of 3°. With respect to the crosslinking properties, $M_H$ represents the maximum torque, $M_L$ represents the minimum torque, and $M_H-M_L$ means the degree of crosslinking. The crosslinking properties are indices for the crosslinkability of the fluorinated elastic copolymer, and a higher value of $(M_H-M_L)$ means excellent crosslinkability. The unit of the torque is dN·m. Further, $t_{10}$ and $t_{90}$ are the 10% crosslinking time and the 90% crosslinking time, and represent the times required until the torque reached 10% and 90% of the maximum torque observed during measurement of the crosslinking properties, respectively. A smaller $t_{90}$ means quicker crosslinking.

Further, the fluorinated elastic copolymer composition was subjected to hot pressing at 170° C. for 20 minutes and then subjected to secondary crosslinking in an oven at 200° C. for 4 hours to obtain a crosslinked rubber sheet of the fluorinated elastic copolymer composition having a thickness of 2 mm. A sample was punched out from the obtained crosslinked rubber sheet by a No. 3 dumbbell. In accordance with JIS K6251, the 100% tensile stress, the tensile strength and the elongation at break were measured. Further, in accordance with JIS K6253, the hardness was measured.

(Compression Set)

The above fluorinated elastic copolymer composition was subjected to a compression set test in accordance with JIS K6262 at 200° C. for 72 hours to measure the compression set.

Example 1

Preparation of Fluorinated Elastic Copolymer A

A pressure reactor made of stainless steel having an internal capacity of 3,200 mL equipped with a stirring anchor blade was deaerated, and to this reactor, 1,500 g of deionized water, 60 g of disodium hydrogen phosphate dodecahydrate, 0.9 g of sodium hydroxide, 198 g of tert-butanol, 9 g of $C_2F_5OCF_2CF_2OCF_2COONH_4$ as a fluorinated emulsifier and 3.8 g of ammonium persulfate were added. Further, an aqueous solution having 0.4 g of disodium ethylenediaminetetraacetate dihydrate (hereinafter referred to as EDTA) and 0.3 g of ferrous sulfate heptahydrate dissolved in 200 g of deionized water, was added to the reactor. At that time, the pH of the aqueous medium in the reactor was 9.5.

Then, a monomer mixed gas of TFE/P=88/12 (molar ratio) was injected at 24° C. so that the internal pressure of the reactor became 2.50 MPaG. The anchor blade was rotated at 300 rpm, and 6.4 g of 1,4-diiodoperfluorobutane was added. Then, a 2.5 mass % aqueous solution of sodium hydroxymethanesulfinate dihydrate (hereinafter referred to as Rongalite) having the pH adjusted to 10.0 by sodium hydroxide (hereinafter this aqueous solution will be referred to as a Rongalite 2.5 mass % aqueous solution) was added to the reactor to initiate the polymerization reaction. From then on, the Rongalite 2.5 mass % aqueous solution was continuously added to the reactor by a high pressure pump.

The polymerization was made to proceed while the polymerization temperature was maintained at 24° C., and since the internal pressure of the reactor decreases as the polymerization proceeds, a monomer mixed gas of TFE/P=56/44 (molar ratio) was injected when the internal pressure of the reactor decreased to 2.49 MPaG to increase the internal pressure of the reactor to 2.51 MPaG. This operation was repeatedly carried out to maintain the internal pressure of the reactor to from 2.49 to 2.51 MPaG to continue the polymerization reaction. When the total amount of the TFE/P monomer mixed gas injected reached 900 g, the addition of the Rongalite 2.5 mass % aqueous solution was terminated, the temperature in the reactor was decreased to 10° C. to terminate the polymerization reaction thereby to obtain a latex of fluorinated elastic copolymer A. The pH of the obtained latex was 8.0. The amount of the Rongalite 2.5 mass % aqueous solution added was 88 g. The polymerization time was about 7 hours.

The latex of fluorinated elastic copolymer A was added to a 5 mass % aqueous solution of calcium chloride to be subjected to coagulation by salting out, thereby to precipitate fluorinated elastic copolymer A. Fluorinated elastic copolymer A was subjected to filtration and collected. Then, fluorinated elastic copolymer A was washed with deionized water and dried in an oven at 100° C. for 15 hours to obtain 880 g of white fluorinated elastic copolymer A.

The ratio of the repeating units based on TFE to the repeating units based on P in fluorinated elastic copolymer A was 56/44 (molar ratio). Further, of fluorinated elastic copolymer A, the Moony viscosity was 80, the specific gravity was 1.55, and the glass transition temperature was −3° C.

Crosslinking properties and crosslinked rubber physical properties of fluorinated elastic copolymer A are shown in Table 1.

Example 2

Preparation of Fluorinated Elastic Copolymer B

A latex of fluorinated elastic copolymer B was obtained in the same manner as in Example 1 except that the amount of 1,4-diiodoperfluorobutane added was 12.8 g, and the total amount of the TFE/P monomer mixed gas injected was 800 g. The pH of the obtained latex was 7.8. The amount of the Rongalite 2.5 mass % aqueous solution added was 90 g. The polymerization time was about 6 hours. In the same manner as in Example 1, 760 g of fluorinated elastic copolymer B was obtained from the latex of fluorinated elastic copolymer B.

The ratio of the repeating units based on TFE to the repeating units based on P in fluorinated elastic copolymer B was 56/44 (molar ratio). Further, of fluorinated elastic copolymer B, the Moony viscosity was 27, the specific gravity was 1.55, and the glass transition temperature was −3° C.

Crosslinking properties and crosslinked rubber physical properties of fluorinated elastic copolymer B are shown in Table 1.

Example 3

Preparation of Fluorinated Elastic Copolymer C

A latex of fluorinated elastic copolymer C was obtained in the same manner as in Example 1 except that 9 g of ammonium perfluorooctanoate was added instead of $C_2F_5OCF_2CF_2OCF_2COONH_4$ as a fluorinated emulsifier. The pH of the obtained latex was 8.0. The amount of the Rongalite 2.5 mass % aqueous solution added was 85 g. The polymerization time was about 7 hours.

In the same manner as in Example 1, 880 g of fluorinated elastic copolymer B was obtained from the latex of fluorinated elastic copolymer C.

The ratio of the repeating units based on TFE to the repeating units based on P in fluorinated elastic copolymer C was 56/44 (molar ratio). Further, of fluorinated elastic copolymer C, the Moony viscosity was 77, the specific gravity was 1.55, and the glass transition temperature was −3° C.

Crosslinking properties and crosslinked rubber physical properties of fluorinated elastic copolymer C are shown in Table 1.

Example 4

Preparation of Fluorinated Elastic Copolymer D

A latex of fluorinated elastic copolymer D was obtained in the same manner as in Example 1 except that the polymerization temperature was 40° C., and the total amount of the TFE/P monomer mixed gas injected was 800 g. The pH of the obtained latex was 7.6. The amount of the Rongalite 2.5 mass % aqueous solution added was 90 g. The polymerization time was about 6 hours.

In the same manner as in Example 1, 780 g of fluorinated elastic copolymer B was obtained from the latex of fluorinated elastic copolymer D.

The ratio of the repeating units based on TFE to the repeating units based on P in fluorinated elastic copolymer D was 56/44 (molar ratio). Further, of fluorinated elastic copolymer D, the Moony viscosity was 60, the specific gravity was 1.55, and the glass transition temperature was −3° C.

Crosslinking properties and crosslinked rubber physical properties of fluorinated elastic copolymer D are shown in Table 1.

Example 5

Preparation of Fluorinated Elastic Copolymer E

A latex of fluorinated elastic copolymer E was obtained in the same manner as in Example 1 except that 4.4 g of 1,4-diiodobutane was added instead of 1,4-diiodoperfluorobutane. The pH of the obtained latex was 7.6. The amount of the Rongalite 2.5 mass % aqueous solution added was 99 g. The polymerization time was about 7 hours.

In the same manner as in Example 1, 880 g of fluorinated elastic copolymer E was obtained from the latex of fluorinated elastic copolymer E.

The ratio of the repeating units based on TFE to the repeating units based on P in fluorinated elastic copolymer E was 56/44 (molar ratio). Further, of fluorinated elastic copolymer E, the Moony viscosity was 95, the specific gravity was 1.55, and the glass transition temperature was −3° C.

Crosslinking properties and crosslinked rubber physical properties of fluorinated elastic copolymer E are shown in Table 1.

Example 6

Preparation of Fluorinated Elastic Copolymer F

A latex of fluorinated elastic copolymer F was obtained in the same manner as in Example 1 except that the polymerization temperature was 20° C. The pH of the obtained latex was 7.9. The amount of the Rongalite 2.5 mass % aqueous solution added was 85 g. The polymerization time was about 7 hours.

In the same manner as in Example 1, 880 g of fluorinated elastic copolymer F was obtained from the latex of fluorinated elastic copolymer F.

The ratio of the repeating units based on TFE to the repeating units based on P in fluorinated elastic copolymer F was 56/44 (molar ratio). Further, of fluorinated elastic copolymer F, the Moony viscosity was 83, the specific gravity was 1.55, and the glass transition temperature was −3° C.

Crosslinking properties and crosslinked rubber physical properties of fluorinated elastic copolymer F are shown in Table 1.

Example 7

Preparation of Fluorinated Elastic Copolymer H

A latex of fluorinated elastic copolymer H was obtained in the same manner as in Example 1 except that 7.8 g of 1,6-diiodoperfluorohexane was added instead of 1,4-diiodoperfluorobutane, and the polymerization temperature was 30° C. The pH of the obtained latex was 7.5. The amount of the Rongalite 2.5 mass % aqueous solution added was 90 g. The polymerization time was about 7 hours.

In the same manner as in Example 1, 880 g of fluorinated elastic copolymer H was obtained from the latex of fluorinated elastic copolymer H.

The ratio of the repeating units based on TFE to the repeating units based on P in fluorinated elastic copolymer E was 56/44 (molar ratio). Further, of fluorinated elastic copolymer H, the Moony viscosity was 95, the specific gravity was 1.55, and the glass transition temperature was −3° C.

Crosslinking properties and crosslinked rubber physical properties of fluorinated elastic copolymer H are shown in Table 1.

Comparative Example 1

Preparation of Fluorinated Elastic Copolymer G

A pressure reactor made of stainless steel having an internal capacity of 3,200 mL equipped with a stirring anchor blade was deaerated, and to this reactor, 1,500 g of deionized water, 60 g of disodium hydrogen phosphate dodecahydrate, 0.9 g of sodium hydroxide, 198 g of tert-butanol and 9 g of ammonium perfluorooctanoate as a fluorinated emulsifier were added. At that time, the pH of the aqueous medium in the reactor was 10.0.

Then, a monomer mixed gas of TFE/P=88/12 (molar ratio) was injected at 75° C. so that the internal pressure of the reactor became 2.50 MPaG. The anchor blade was rotated at 300 rpm, and 6.4 g of 1,4-diiodoperfluorobutane was added. Then, a 14.4 mass % aqueous solution of ammonium persulfate having the pH adjusted to 10.0 by sodium hydroxide was added to the reactor to initiate the polymerization reaction. From then on, the 14.4 mass % aqueous solution of ammonium persulfate was added by a high pressure pump and the polymerization was made to proceed while the temperature was maintained at 75° C., and since the pressure in the reactor decreases as the polymerization proceeds, when the internal pressure of the reactor decreased to 2.49 MPaG, a monomer mixed gas of TFE/P=56/44 (molar ratio) was injected to increase the internal pressure of the reactor to 2.51 MPaG. This operation was repeatedly carried out to maintain the internal pressure of the reactor to from 2.49 to 2.51 MPaG to continue the polymerization reaction. The 14.4 mass % aqueous solution of ammonium persulfate was added in an amount of 66 g as the 14.4 mass % aqueous solution of ammonium persulfate over a period of 4 hours from initiation of the polymerization. When the total amount of the TFE/P monomer mixed gas injected reached 800 g, the internal pressure of the reactor was decreased to 10° C. to terminate the polymerization reaction thereby to obtain a latex of fluorinated elastic copolymer G. The pH of the obtained latex was 7.0. The polymerization time was about 13 hours.

The latex of fluorinated elastic copolymer G was added to a 5 mass % aqueous solution of calcium chloride to be subjected to coagulation by salting out, thereby to precipitate fluorinated elastic copolymer G, and fluorinated elastic copolymer G was subjected to filtration and collected. Then, fluorinated elastic copolymer G was washed with deionized water and dried in an oven at 100° C. for 15 hours to obtain 770 g of white fluorinated elastic copolymer G.

Of fluorinated elastic copolymer G, the Moony viscosity was 30, the specific gravity was 1.55, and the glass transition temperature was −3° C. Crosslinking properties and crosslinked rubber physical properties of fluorinated elastic copolymer G are shown in Table 2.

Comparative Example 2

Preparation of Fluorinated Elastic Copolymer J

A latex of fluorinated elastic copolymer J was obtained in the same manner as in Example 1 except that no 1,4-diiodoperfluorobutane was added. The pH of the obtained latex was 7.5. The amount of the Rongalite 2.5 mass % aqueous solution added was 70 g, and the polymerization time was about 7 hours.

In the same manner as in Example 1, 900 g of fluorinated elastic copolymer J was obtained from the latex of fluorinated elastic copolymer J. Crosslinking properties and crosslinked rubber physical properties of fluorinated elastic copolymer J are shown in Table 2.

Comparative Example 3

"AFLAS 150E" (tradename) manufactured by Asahi Glass Company, Limited was used as the fluorinated elastic copolymer. "AFLAS 150E" is a tetrafluoroethylene-propylene copolymer, and its ratio of the repeating units based on TFE to the repeating units based on P was 56/44 (molar ratio).

Of "AFLAS 150E", the Moony viscosity was 60, the specific gravity was 1.55, and the glass transition temperature was −3° C. Crosslinking properties and crosslinked rubber physical properties of "AFLAS 150E" are shown in Table 2.

TABLE 1

|  | Ex. 1 | Ex. 2 | Ex. 3 | Ex. 4 | Ex. 5 | Ex. 6 | Ex. 7 |
|---|---|---|---|---|---|---|---|
| Fluorinated elastic copolymer | A | B | C | D | E | F | H |
| $M_H$ [dNm] | 48 | 68 | 51 | 40 | 48 | 49 | 48 |
| $M_L$ [dNm] | 2 | 1 | 2 | 1 | 4 | 2 | 2 |
| $M_H - M_L$ [dNm] | 46 | 67 | 49 | 39 | 44 | 47 | 46 |
| $t_{10}$ | 0.7 | 0.8 | 0.7 | 0.7 | 0.7 | 0.7 | 0.7 |
| $t_{90}$ | 2.8 | 3.6 | 3.0 | 2.9 | 3.1 | 2.5 | 2.8 |
| Tensile strength [MPa] | 15 | 17 | 15 | 13 | 14 | 16 | 15 |
| 100% tensile stress [MPa] | 6 | 7 | 6 | 4 | 5 | 6 | 6 |
| Elongation [%] | 310 | 230 | 330 | 330 | 320 | 300 | 300 |
| Hardness (shore A) | 74 | 79 | 76 | 72 | 74 | 75 | 75 |
| Compression set [%] | 30 | 27 | 30 | 33 | 43 | 30 | 30 |

TABLE 2

|  | Comp. Ex. 1 | Comp. Ex. 2 | Comp. Ex. 3 |
|---|---|---|---|
| Fluorinated elastic copolymer | G | J | 150E |
| $M_H$ [dNm] | 15 | 43 | 28 |
| $M_L$ [dNm] | 1 | 17 | 3 |
| $M_H - M_L$ [dNm] | 14 | 26 | 25 |
| $t_{10}$ | 0.7 | 1.0 | 0.9 |
| $t_{90}$ | 2.8 | 5.3 | 7.1 |
| Tensile strength [MPa] | 5 | 9 | 13 |
| 100% tensile stress [MPa] | 3 | 3 | 5 |
| Elongation [%] | 330 | 500 | 340 |
| Hardness (shore A) | 72 | 65 | 70 |
| Compression set [%] | 60 | 70 | 32 |

Each of fluorinated elastic copolymers in Examples 1 to 6 obtained by polymerization at a polymerization temperature of at most 50° C. had a high value of ($M_H-M_L$) and was excellent in the crosslinkability. Further, they showed excellent crosslinked rubber physical properties.

Fluorinated elastic copolymer in Comparative Example 1 obtained by polymerization at a polymerization temperature exceeding 50° C. was poor in the crosslinkability, and was insufficient in the crosslinked rubber physical properties.

Example 8

70 Parts by mass of fluorinated elastic copolymer B, 30 parts by mass of fluorinated elastic copolymer J, 30 parts by mass of carbon black, 5 parts by mass of triallyl isocyanurate and 1 part by mass of 1,3-bis(tert-butylperoxyisopropyl)benzene (manufactured by Kayaku Akzo Corporation, tradename "Perkadox 14") were kneaded by twin rolls at room temperature for 10 minutes to obtain a uniformly mixed fluorinated elastic copolymer composition. Crosslinking properties and crosslinked rubber physical properties are shown in Table 3.

Example 9

70 Parts by mass of fluorinated elastic copolymer B, 30 parts by mass of "AFLAS 150E" (tradename) manufactured by Asahi Glass Company, Limited, 30 parts by mass of carbon black, 5 parts by mass of triallyl isocyanurate and 1 part by mass of 1,3-bis(tert-butylperoxyisopropyl)benzene (manufactured by Kayaku Akzo Corporation, tradename "Perkadox 14") were kneaded by twin rolls at room temperature for 10 minutes to obtain a uniformly mixed fluorinated elastic copolymer composition. Crosslinking properties and crosslinked rubber physical properties are shown in Table 3.

Example 10

With 70 parts by mass of fluorinated elastic copolymer A, 30 parts by mass of "ESPRENE 505A" (tradename) manufactured by Sumitomo Chemical Co., Ltd. as an ethylene-propylene-disconjugated diene copolymer, 30 parts by mass of carbon black, 5 parts by mass of triallyl isocyanurate and 1 part by mass of 1,3-bis(tert-butylperoxyisopropyl)benzene (manufactured by Kayaku Akzo Corporation, tradename "Perkadox 14") were kneaded by twin rolls at room temperature for 10 minutes to obtain a uniformly mixed fluorinated elastic copolymer composition. Crosslinking properties and crosslinked rubber physical properties are shown in Table 3.

TABLE 3

|  | Ex. 8 | Ex. 9 | Ex. 10 |
|---|---|---|---|
| Fluorinated elastic copolymer composition (mass ratio) | B/J (70/30) | B/150E (70/30) | A/505A (70/30) |
| $M_H$ [dNm] | 60 | 50 | 90 |
| ML [dNm] | 12 | 2 | 1 |
| $M_H - M_L$ [dNm] | 48 | 48 | 89 |
| $t_{10}$ | 0.8 | 0.8 | 0.9 |
| $t_{90}$ | 3.8 | 3.7 | 4.0 |
| Tensile strength [MPa] | 15 | 15 | 14 |
| 100% tensile stress [MPa] | 5 | 6 | 9 |
| Elongation [%] | 320 | 270 | 220 |
| Hardness (shore A) | 74 | 75 | 70 |
| Compression set [%] | 40 | 30 | 20 |

(Spiral Flow Test)

The spiral flow length of each of the fluorinated elastic copolymer compositions in Example 1 and Comparative Examples 1 and 2 was measured by the following apparatus under the following conditions. The results are shown in Table 2.

Injection molding machine: Rubber injection molding machine STI-0.5-75VA, manufactured by SANYU INDUSTRIES LTD.
Barrel temperature: 80° C.
Mold temperature: 180° C.
Injection time: 5 seconds
Heating time: 5 minutes
Spiral mold: 8×4×1230 mm

TABLE 4

|  | Ex. 1 | Comp. Ex. 1 | Comp. Ex. 2 |
|---|---|---|---|
| Spiral flow length [cm] | 40 | 45 | 30 |

The fluorinated elastic copolymer composition in Example 1 was excellent in flowability and was suitable for injection molding. Further, a crosslinked rubber comprising the fluorinated elastic copolymer composition in Example 1 could be easily removed from the mold after heating, and no stain in the mold was confirmed. Whereas, each of crosslinked rubbers comprising the fluorinated elastic copolymer compositions in Comparative Examples 1 and 2 was not easily removed from the mold since they are insufficiently crosslinked, and part of the fluorinated elastic copolymer composition was attached to the mold after release.

Industrial Applicability

The fluorinated elastic copolymer of the present invention can be formed into a crosslinked rubber by crosslinking reaction. The crosslinked rubber is suitable as a material for an O-ring, a sheet, a gasket, an oil seal, a diaphragm, a V-ring, etc. Further, it is also applicable to a heat resistant chemical resistant sealing material, a heat resistant oil resistant sealing material, a wire covering material, a sealing material for a semiconductor device, a corrosion resistant rubber coating material, a urea resistant sealing material for a grease, etc. Particularly, as it is excellent in flowability, it is suitable for an application of a rubber product having a complicated shape or a product obtainable by injection molding.

The entire disclosure of Japanese Patent Application No. 2008-087936 filed on Mar. 28, 2008 including specification, claims and summary is incorporated herein by reference in its entirety.

What is claimed is:

1. A process for producing a fluorinated elastic copolymer, which comprises copolymerizing tetrafluoroethylene and propylene and optionally a perfluoro(alkyl vinyl ether) in the presence of a radical polymerization initiator and an iodine compound represented by the formula $RI_2$ wherein R is an alkylene group or perfluoroalkylene group having at least 3 carbon atoms at a polymerization temperature of from 0° C. to 50° C.,
wherein the radical polymerization initiator comprises a redox polymerization initiator.

2. The process for producing a fluorinated elastic copolymer according to claim 1, wherein the copolymerizing comprises carrying out emulsion polymerization in an aqueous medium in the presence of an emulsifier at a pH of the aqueous medium of from 7 to 14.

3. The process for producing a fluorinated elastic copolymer according to claim 1, wherein the redox polymerization initiator comprises ammonium persulfate and hydroxymethanesulfinate.

4. The process for producing a fluorinated elastic copolymer according to claim 1, wherein the iodine compound represented by the formula $RI_2$ is at least one member selected from the group consisting of 1,3-diiodopropane, 1,4-diiodobutane, 1,6-diiodohexane, 1,8-diiodooctane, 1,3-diiodoperfluoropropane, 1,4-diiodoperfluorobutane, 1,6-diiodoperfluorohexane and 1,8-diiodoperfluorooctane.

5. The process for producing a fluorinated elastic copolymer according to claim 2, wherein the emulsifier is a fluorinated ether carboxylic acid compound represented by the formula (1): $R^{f1}OR^{f2}COOA$, wherein $R^{f1}$ is a $C_{1-8}$ perfluoroalkyl group, $R^{f2}$ is a linear fluorinated alkylene group, the fluorinated alkylene group may have an etheric oxygen atom, and the fluorinated alkylene group may have a side chain of a $C_{1-3}$ perfluoroalkyl group, and A is a hydrogen atom, an alkali metal or $NH_4$.

6. The process for producing a fluorinated elastic copolymer according to claim 2, wherein the emulsifier is a fluorinated ether carboxylic acid compound represented by the formula (2): $F(CF_2)_pO(CF(X)CF_2O)_qCF(X)COOA$, wherein X is a fluorine atom or a $C_{1-3}$ perfluoroalkyl group, A is a hydrogen atom, an alkali metal or $NH_4$, p is an integer of from 1 to 10, and q is an integer of from 0 to 3.

7. The process for producing a fluorinated elastic copolymer according to claim 1, wherein the redox polymerization initiator is included in an amount of from 0.001 to 1 mass % of a total mass of monomers.

8. The process for producing a fluorinated elastic copolymer according to claim 1, wherein the redox polymerization initiator is present with disodium ethylenediaminetetraacetate.

9. The process for producing a fluorinated elastic copolymer according to claim 1, wherein tetrafluoroethylene, propylene and a perfluoro(alkyl vinyl ether) are copolymerized.

10. The process for producing a fluorinated elastic copolymer according to claim 1, wherein tetrafluoroethylene, propylene and a perfluoro(alkyl vinyl ether) are copolymerized such that a molar ratio of repeating units based on tetrafluoroethylene/repeating units based on propylene/repeating units based on perfluoro(alkyl vinyl ether) in the fluorinated elastic copolymer is 30 to 60/10 to 40/10 to 40.

11. The process for producing a fluorinated elastic copolymer According to claim 1. wherein the polymderization temperature is 24° C. or lower.

12. The process for producing a fluorinated elastic copolymer according to claim 1, wherein the emulsifier comprises one selected from the group consisting of $F(CF_2)_2OCF_2CF_2OCF_2COONH_4$, $F(CF_2)_2O(CF_2CF_2O)_2CF_2COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O))_2CF_2COONH_4$ and $F(CF_2)_2OCF(CF_3)CF_2OCF(CF_3)COONH_4$.

13. The process for producing a fluorinated elastic copolymer according to claim 2, wherein the emulsifier is included in an amount of from 0.1 to 3 parts by mass per 100 parts by mass of the aqueous medium.

14. The process for producing a fluorinated elastic copolymer According to claim 2, wherein the pH of the aqueous medium is in a range from 8 to 10.5.

15. The process for producing a fluorinated elastic copolymer according to claim 2, wherein the pH of the aqueous medium is in a range of from 8 to 10.5, and the pH is within the range at least 95° A of an entire polymerization period.

16. The process for producing a fluorinated elastic copolymer according to claim 2, wherein the redox polymerization initiator comprises ammonium persulfate and hydroxymethanesulfinate, ammonium persulfate is included in an amount of from 0.05 to 0.5 mass % per 100 mass % of the aqueous medium, and hydroxymethanesulfinate is included in an amount of from 0.05 to 0.5 mass % per 100 mass % of the aqueous medium.

* * * * *